UNITED STATES PATENT OFFICE 2,581,749

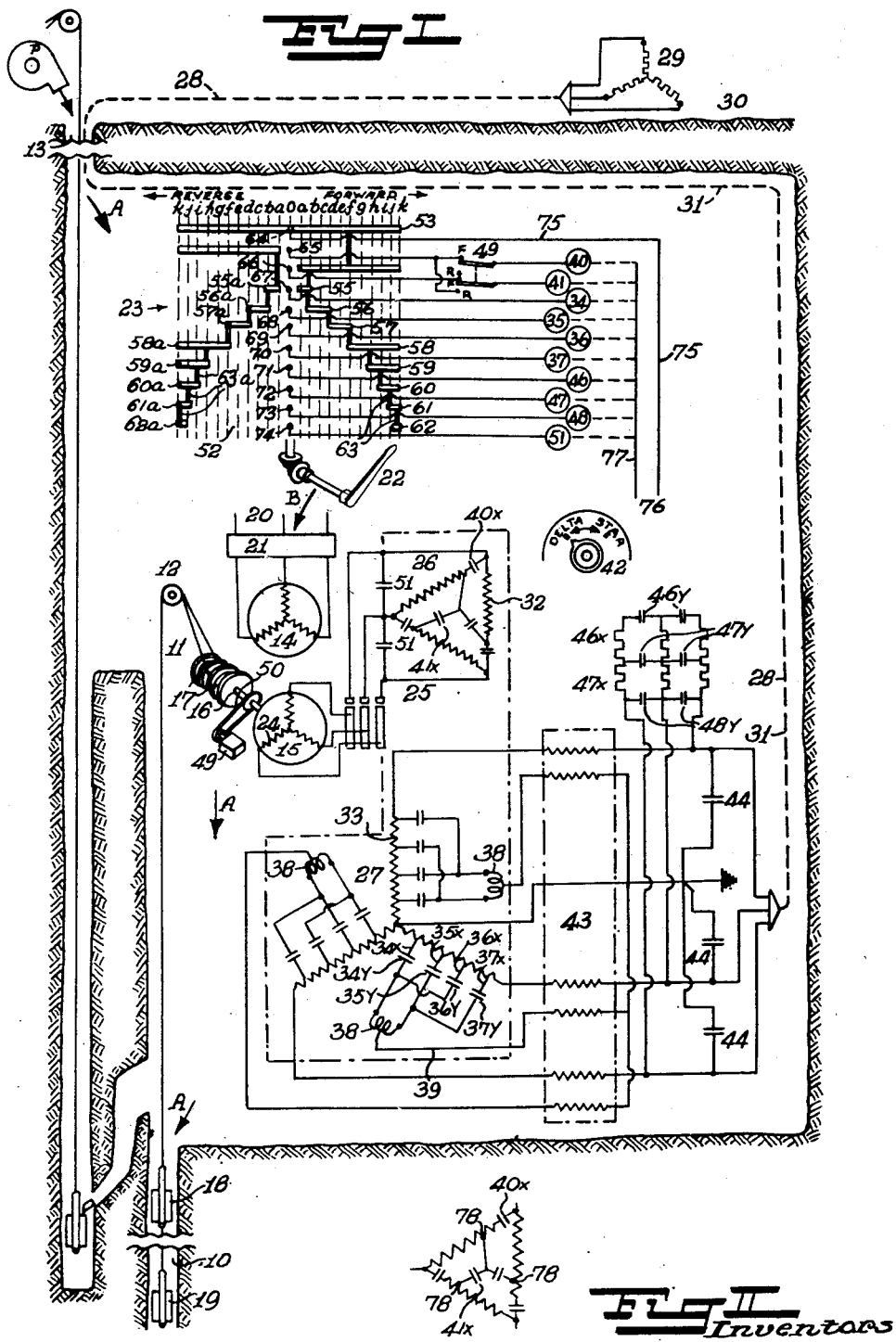

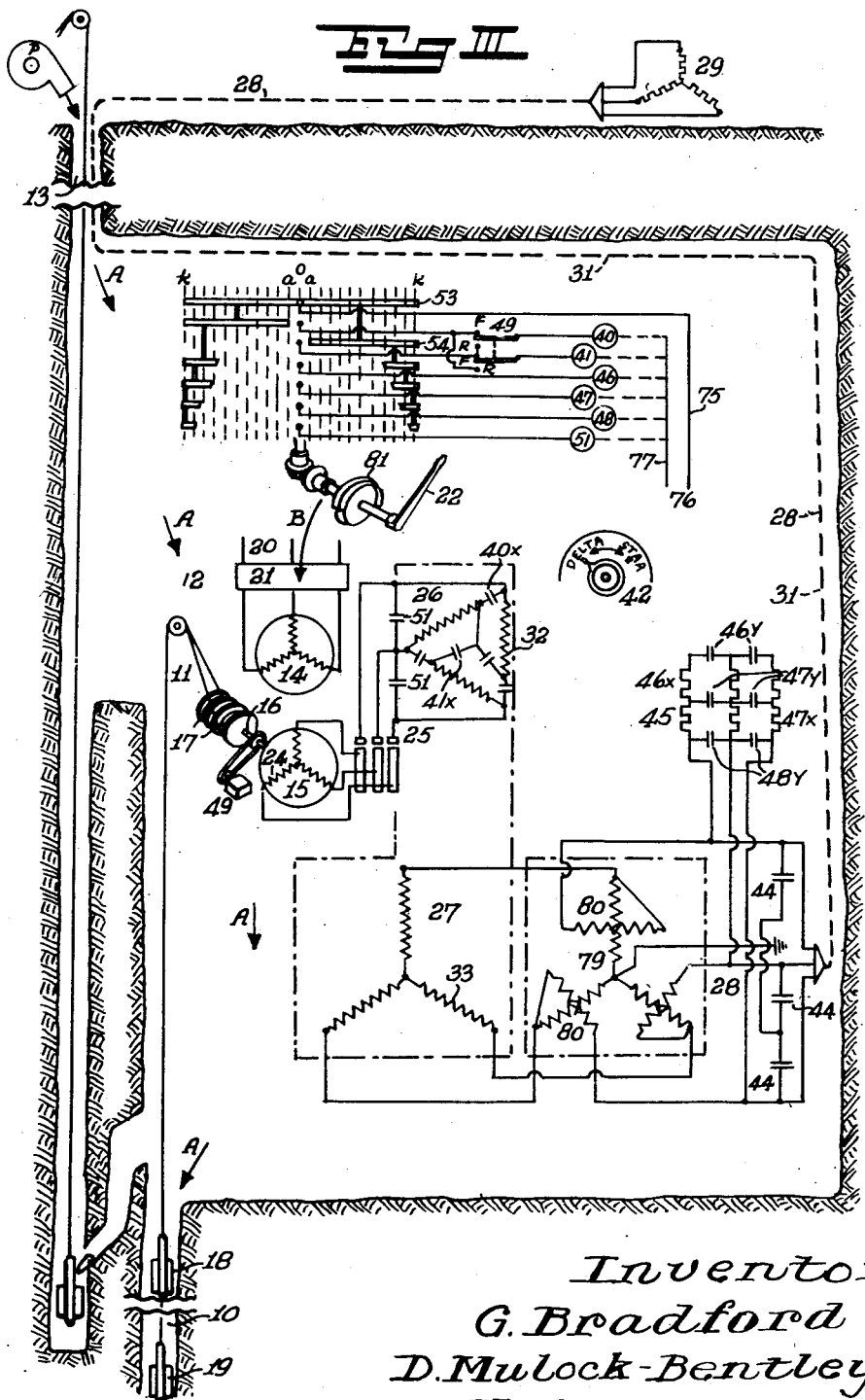

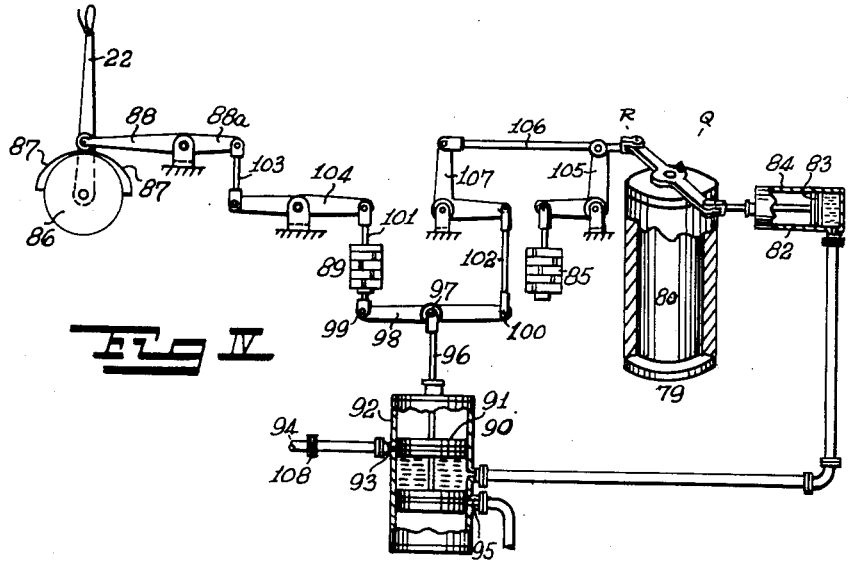
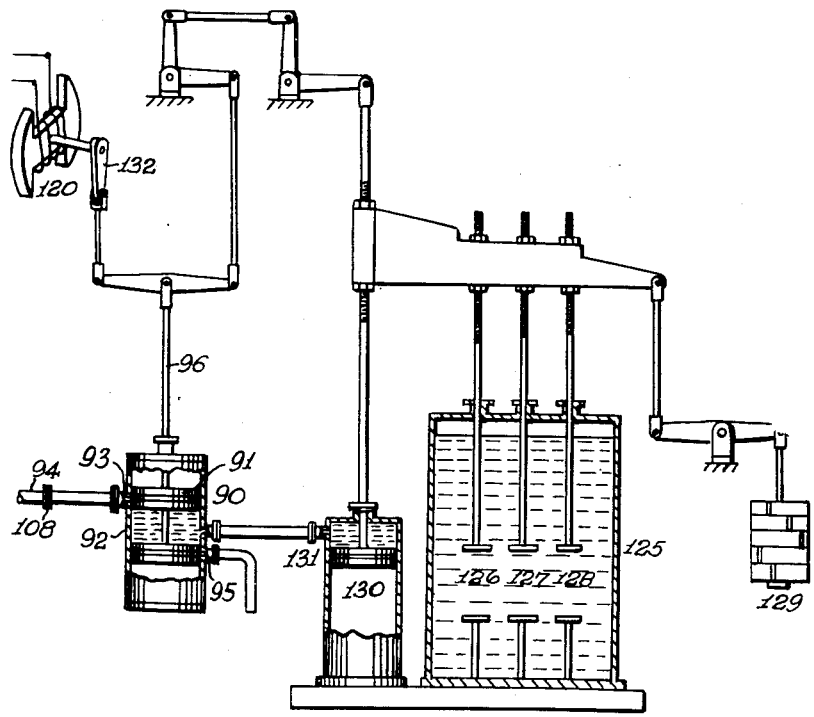

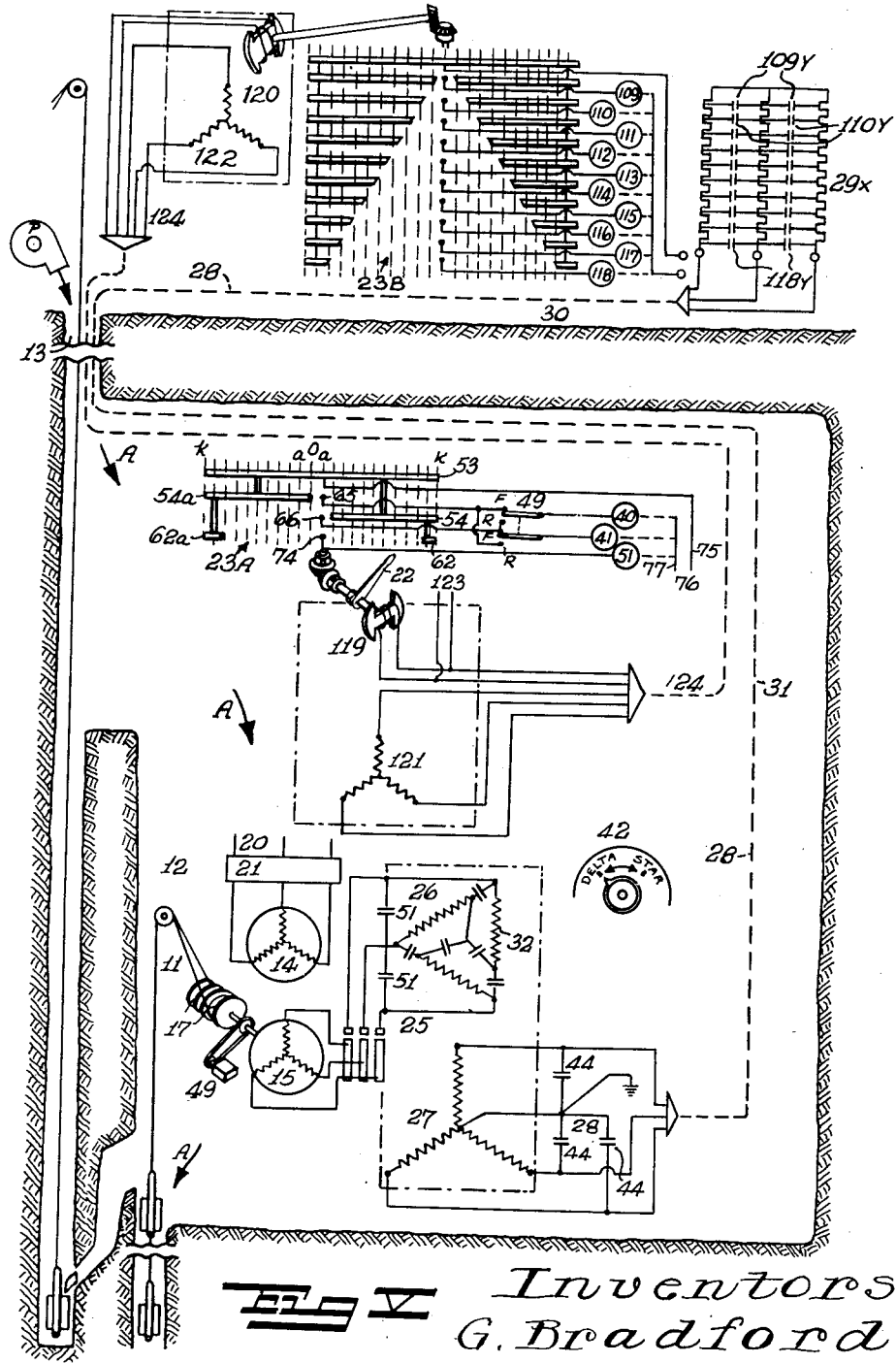

REMOTE SURPLUS ENERGY DISSIPATION FOR WOUND ROTOR INDUCTION MOTORS

George Bradford, Desmond Mulock-Bentley, and Norman Hugh Auret, Johannesburg, Transvaal, Union of South Africa, assignors to Anglo American Corporation of South Africa, Limited, Johannesburg, Transvaal, Union of South Africa Application February 27, 1947, Serial No. 731,326
In the Union of South Africa December 21, 1946

9 Claims. (Cl. 98—50)

This invention relates to induction motors having a wound rotor and positioned in a mine; and to processes of dealing with the electrical energy that is generated in the rotor circuit as the result of energising said circuit and inserting a resistance thereinto for the purpose of controlling the torque of the motor when the conditions governing the mechanical output of the motor are such that the whole of the useful electrical energy input to the motor cannot be expended as mechanical output, so that a portion at least of such electrical input becomes surplus and appears as the aforesaid rotor current in the external resistance circuit. The kind of mine with which the invention is concerned is one having an organized ventilating system whereby fresh air is distributed to mine workings and including a downcast side comprising a chamber, a compartment or drive in which the motor is situated and through which downcast ventilating air passes to other workings.

In present practice such surplus energy is disposed of, as heat energy, by passing the rotor current through a structural or a liquid resistance unit of variable value included in the rotor circuit and positioned in close proximity to the motor. This position of the resistance results in undesirable heat being dissipated into the downcast ventilating air and it is one of the objects of the invention to eliminate the resistance unit in close proximity to the motor. The invention attains this object by transmitting the aforesaid surplus electrical energy to a position remote from the motor and there expending it in any convenient manner or form, for instance as heat.

The term remote is here used in the sense that at least the position is one at which the energy can be expended whilst avoiding the above-mentioned detrimental results; and usually the term also connotes considerable spatial remoteness.

A further object of the invention is to provide in the rotor circuit, a resistance that is a complete substitute for the usual structural or liquid resistance as far as the essential functions of the latter are concerned, but which enables expenditure of surplus energy in the rotor circuit to be avoided. The invention accomplishes this object by producing a virtual resistance in the energised rotor circuit and transmitting and expending, out of the rotor circuit, the surplus electrical energy thereby generated in the said circuit.

The production of the virtual resistance in the rotor circuit is effected by linkage of the rotor circuit with a transmission circuit containing a load offering real ohmic resistance and so that said real resistance is reflected in the rotor circuit as the virtual resistance. The virtual resistance has the same useful effects in the rotor circuit as a real resistance in said circuit would have; but itself consumes no energy; practically the whole of the surplus electrical energy generated in the rotor circuit being passed on to the linked transmission circuit, where it is consumed by the load providing the ohmic resistance.

It will be evident that the process last described is a convenient means of transmitting the surplus energy away from the vicinity of the motor; and also of enabling the real resistance to be placed in any position desired relatively to the motor.

The linkage between the rotor circuit and the transmission circuit is magnetic, and in the examples hereafter described is effected by transformation of the rotor current into the transmission circuit.

The invention further provides for varying the magnitude of the virtual resistance, for the purpose for which the real resistance in present wound rotor induction motors is varied; and it is a further object of the invention to provide for that purpose circuits comprising well known and proved pieces of apparatus.

A convenient way of varying the magnitude of the virtual resistance is by adjustment of the degree of the linkage e. g. by varitaion of the ratio of transformation between the circuits. Variation of the ratio of transformation may be carried out by variation of the ratio of the transformer turns; or by inductive regulation of a fixed transformer ratio. In any of these instances the real resistance load can be of invariable magnitude. In another case, the real resistance load is made variable, and is remotely adjusted from the immediate vicinity of the motor; in which case a linking transformer of fixed transforming ratio is evidently suitable.

It is preferred to use, as the linking transformer in all the cases mentioned above, the well known kind of transformer having a normally delta-connected primary winding and a star connected secondary winding. In those cases where the transformation ratio is intended to be adjusted by varying the ratio of the transformer turns, this variation is provided for by taps in the secondary winding. In order to make the tap-changing of the "on-load" type, and also to increase conveniently the number of steps of the transformation ratio, beyond the number of tappings, the invention contemplates the known provision, in each phase, of a reactor connected to bridge each pair of adjacent taps, with the common lead for the phase led out of the middle of the reactor.

Since the reduction of the virtual resistance by increase of the ratio of the transformation ratio is asymptotic, there is provided in conjunction with a linking transformer of that type, auxiliary real resistance adapted to be cut into and out of the transmission circuit and in parallel with the principal real resistance therein. Particularly, such auxiliary resistance is cut in progressively when the virtual resistance has reached a low value; and thereby increases the rate of reduction of the virtual resistance towards zero.

When the transmission circuit is a long one the transforming apparatus is constructed to perform the secondary function of boosting the voltage in the transmission circuit to a higher value suitable for long distance transmission.

Dealing with the underground heat problem, the facility which the invention provides for the displacement of heat generation from the vicinity of the motor to a distant position can be of considerable technical value where adequate means for the removal of the heat from the vicinity of the motor by the usual procedure of imparting the heat to a carrier fluid and particularly to the surrounding atmosphere, is not available and/or desirable. An important example of such a state of affairs occurs in the case of a large variable speed wound rotor induction motor installed underground in a mine that is already naturally hot.

Such a large underground motor would in many cases be the motor of an underground hoist and be installed in a rock chamber adjacent to the junction of a primary shaft with a sub-shaft; and the cooling method often unavoidably employed heretofore in such a lay-out is to route downcast air coming from the primary shaft, through the hoist chamber and to the sub-shaft; with the result that all heat thus removed from the motor and associated apparatus is carried into the lower workings of the mine, which, in a mine deep enough to have a sub-shaft, can be expected to be already hot.

As an example, in a typical case studied, it was calculated that two induction-motor-driven hoists, intended for dynamic braking would dissipate heat at an average rate of 33,670 B. t. u. per minute. 150,000 cubic feet of ventilating air per minute were assumed to pass through the hoist chamber; resulting in the following temperature changes:

Temperature on admission to the chamber—
    75° F. wet bulb
    84° F. dry bulb
Temperature on leaving chamber—
    78.3° F. wet bulb
    96.7° F. dry bulb In the case quoted the inventors studied the evolution of heat by both A. C. and Ward-Leonard hoists and ascertained that whilst the A. C. hoist dissipates more energy as heat for a similar duty cycle, approximately 85 per cent of its heat production comes from the resistance unit. This fact provides the opportunity, in an A. C. hoist as compared with a Ward-Leonard hoist, of collecting the greater part of the evolved heat at a single source and thus of disposing of it by means of the invention. The invention in this respect consists in so arranging the transmission circuit that the surplus energy imparted to said circuit is transmitted by the latter to and expended at a position at which the expenditure can be effected without detriment to the mine ventilating system.

A simple method is to employ, as the real resistance, an ordinary structural resistance unit positioned at the surface of the mine so that the evolved heat is dissipated into the surface atmosphere. Instead of the surface, any other position may be selected provided it is not in the downcast side of the mine ventilating system. Such a position may be so selected that the surplus energy is put to a useful purpose. For instance, by positioning the mechanical resistance unit in the upcast portion of the ventilating system, the evolved heat is caused to assist the upward movement of the ventilating air.

When the invention is applied to motors driving the special kinds of loads mentioned above, viz. loads which vary in magnitude and speed, the motor and the load pass through a succession of duty cycles, each cycle characterised by initial positive acceleration and final negative acceleration, with usually a period of uniform speed between them. The positive acceleration requires progressive modification of the magnitude of the resistance in the rotor circuit; and this is also true of the negative acceleration when the latter is effected either by reverse current or by dynamic (D. C. excitation) braking.

The usual means for carrying out the duty cycles comprises a master controller and a driver's lever rotatable as a unit with the drum of the controller. Contact segments on the drum are positioned relatively to fixed contacts and to corresponding positions of the driver's lever, to excite circuits that bring about the sequence of control steps called for by the duty cycle, when the driver's lever is moved to various positions in accordance with a convention which is often the subject of government mining regulations.

According to said convention as applied to the double drum hoist driving two conveyances in opposite directions which is practically universal in present-day mining installations, the lever and drum unit has a neutral position from which it is moved forward to drive the hoist forward, and from which it is moved in reverse to drive the hoist reversely: the terms "forward" and "reverse" carrying the implication that each is the opposite of the other but otherwise bearing purely conventional meanings.

Among the segments commonly provided are the notching segments for reducing the magnitude of the resistance in the rotor circuit progressively as the driver's lever is notched progressively away from its neutral position in either direction. Other drum contacts are provided for performing functions not directly relevant to the present invention. Associated with the driver's lever are means for stopping the mains supply and re-starting it with the rotation of the stator field reversed, as said lever is moved to and through its neutral position in either direction. When reverse current braking is employed, it is brought about by moving the driver's lever and drum unit, and while the hoist is in motion, from the position causing the field of rotation to be in the direction to maintain said motion, through neutral, and to some position on the other side of neutral.

The invention makes use of this well known and proved control mechanism; with modifications to control the performance of the special functions peculiar to the invention. Among these is the control of the degree of linkage between the rotor circuit and the transmission circuit and, specifically, control of the tappings of the linking transformer above described i. e. having star-connected secondary windings with taps, and intermediate reactors: the cutting in and out of the auxiliary real resistance and the selection of one of the dual basic ratios hereafter referred to.

It is a feature of the invention that the linking transformer is of a multiple basic ratio type, that is one providing the choice of at least two basic transformation ratios, either of which, in the case of what is generally known as a variable ratio transformer, can be selected as the basis of the range of transformation ratios proper to "variable ratio" transformers and provided by other means, such as the tap changing transformer or the induction regulator already referred to.

Accordingly, by co-ordinated use of the change of basic ratio and the "variable" ratio, the virtual resistance is made variable in two sets of steps, with the mean value of each set substantially different from the mean value of the other set. By this means large overall changes of the magnitude of the virtual resistance can readily be obtained whilst desirably limiting the structural cost of the linking transformer to that called for by the one set of ratio changes.

In the case of the linking transformer described above as having a three phase primary winding that is normally delta connected, dual ratio is provided for by making said primary winding interconvertible between delta connection and star connection. The higher basic ratio is obtained by selecting the delta connection; and the lower basic ratio by selecting the star connection. It is further arranged that when the drum-lever unit and the directional switch are positioned "similarly" in the sense that both are in the "forward" position or both are in the "reverse" position, the higher of the two basic ratios is selected but when the drum-lever unit and the directional switch are "oppositely" positioned—that is, either of them is "forward" and the other is "reverse," the lower of the basic ratios is selected. Accordingly, in the case where dual ratio is due to the selection of either the delta or the star connection of the primary windings, in the transformer just mentioned as having a primary winding interconvertible to either delta or star connection, and a star connected secondary winding, the aforesaid state of "oppositeness" is the means of selecting the star connection of the primary winding.

The selection in this way of the desired basic ratio is made operative automatically through the medium of the master controller; but it is desirable that the selection can also be made manually when required.

According to a further feature of the invention, the dual basic ratio of the linking transformer is utilised in a novel method of improving the braking torque control by reverse current. According to the method, concurrently with the reversal of power for reverse current braking, the basic ratio of transformation is changed from the higher value to the lower value. Apparatus for this purpose comprises, as already described, the combination with the lever-drum unit, of a directional switch that is frictionally moved to one or other of its two possible positions, according to the direction of the hoist and motor; so that the position of the directional switch is at all times identified with the direction in which the hoist and motor are moving, or last moved. Said directional switch co-operates with the master controller to select the higher or the lower basic ratio according to whether the switch and the driver's lever are "similar" or "opposite" in the sense mentioned above.

In connection with the form of the invention described above in which the degree of linking is controlled by an induction regulator coupled to the linking transformer, the invention provides a motion transmitting mechanism between the driver's lever or equivalent device, and the rotor of the induction regulator. This transmission mechanism is so constructed that the velocity ratio between the device and the rotor of the induction regulator is non-linear in a manner that makes a linear relationship between displacement of the device and the rate of change of the effective ratio given by the induction regulator. Moreover the rate of rotation of the rotor of the induction regulator in the direction causing positive or negative acceleration of the motor is limited to a predetermined maximum.

In that form of the invention above described in which the real resistance is of variable magnitude and its magnitude is controlled from the vicinity of the hoist the invention makes use of an electrical motion transmitting system. Said system preferably includes a manually movable device, a motion copying rotor in the vicinity of the variable resistance unit, and a controller driven by the motion copying rotor and operating switches controlling the effective value of the resistance. The "Selsyn" system is suitable.

Different forms of the invention incorporated in underground hoists are shown in the accompanying drawings in which:

Figure I shows one such form of apparatus, characterised by the provision of a real ohmic resistance of fixed value and the production therefrom of an adjustable virtual resistance in the rotor circuit, by the use as the linkage of a variable ratio transformer group of well known type.

Figure II shows a detail.

Figure III shows another form of the invention, also including a real ohmic resistance of fixed value, and the production therefrom of a variable virtual resistance in the rotor circuit by the use of a fixed ratio transformer in combination with an induction regulator.

Figure IV shows a mechanism suitable for coupling the driver's lever to the induction regulator.

Figure V shows a third form of the invention, using a real resistance of variable value adjusted by remote control.

Figure VI shows a servomotor mechanism included in the remote control.

Referring to Figure I, 10 indicates a sub-shaft in a mine, served by a hoist 11, erected in a hoist chamber 12 excavated from the rock and accordingly requiring systematic ventilation. For this purpose ventilating air supplied by blower P and indicated by arrows A is by-passed to said chamber 12 from the primary-downcast shaft 13 and thence to the downcast sub-shaft 10; from which the air stream passes to the lower workings of the mine. Any heat acquired by the ventilating air from the hoist motor and associated apparatus, is accordingly passed into said lower workings; with detrimental results when such workings are naturally hot.

The hoist comprises the motor 14, 15, the winder shaft 16 and the winding drums 17 mounted on shaft 16. Each drum operates its respective conveyance 18 or 19. The motor is supplied with three-phase A. C. current from the mains 20. 21 indicates the normal stator reversing contactor device which completes the power supply to the stator 14 and also determines the direction of rotation of the stator field. Said device 21 is actuated by the driver's lever 22; the somewhat intricate but well known mechanism which operatively connects said parts being schematically indicated by the arrow B. The motor and all the operational apparatus to be described, are controlled by the driver's lever 22, mainly through the master controller 23.

The motor is of the orthodox slip ring type; and comprises the stator 14 and the rotor 15, the latter coupled to the winder shaft 16. The rotor carries a winding 24 included in the rotor circuit, which circuit is indicated generally by 25 and which also includes one side 26 of the linking transformer 26, 27. The other side 27 of said transformer is included in the transmission circuit 28. Also included in the transmission circuit is an ordinary structural resistance unit 29, shown as being positioned at the surface 30 of the mine; and a power cable 31 for transmitting electrical current to said unit 29.

The linkage inherently existing between the two sides of the transformer 26, 27 so links the circuits 25 and 28 that the real resistance 29 is reflected as the virtual resistance in the rotor circuit 25, and the surplus electrical energy generated in said rotor circuit is transformed into the transmission circuit 28, from which it is dissipated as heat by the real resistance 29.

The linking transformer 26, 27 shown is of the well-known on-load tap-changing type comprising normally delta-connected primary windings 32 and star-connected secondary windings 33. Subject to what is said later about dual basic ratio, the ratio of this transformer is varied by means of the sets of four taps 34x, 35x, 36x, 37x, one set for each phase, each tap comprising a contactor switch (identified by 34y, 35y, 36y or 37y as the case may be) by which it is opened or closed; said contactor switches of each set being controlled by the master controller 23 to select the tap required. In each set, each pair of adjacent taps is bridged by the reactor 38, from the middle of which the relevant out-going lead 39 is led out.

Furthermore, the transformer 26, 27 is of the dual ratio type specified above; either value of which can be selected as the base of the range of ratios given by the taps 34x to 37x. For this purpose provision is made for reconnecting the primary windings 32 of the linking transformer 26, 27 from delta to star in order to obtain the lower value basic ratio; and from star to delta in order to obtain the high value basic ratio. The means for thus changing said connections consists in the contactor switches 40x and 41x controlled automatically through the medium of the master controller 23; and alternatively controlled by the hand controlled manoeuvring switch 42.

A secondary but important function of the transformation step is to change the somewhat low rotor voltage to the higher value necessary for economical transmission through the cable 31; and for this purpose there is provided, as an extension of the linking transformer proper 26, 27, the booster transformer 43 acting in the well known manner to inject into the transmission circuit 28 a variable voltage directly derived from the linking transformer proper and thereby to increase the range of transformation beyond that which could efficiently be obtained from the linking transformer alone.

Numeral 44 represents the capacitors that are included in the transmission circuit, and preferably in that part of said circuit which is on the output side of the booster transformer 43. The reason for their presence is that in order to obtain the maximum torque characteristics of which the motor 14, 15 is capable, whilst at the same time retaining the required resistance/reactance ratio of the rotor circuit required by formula A (hereafter mentioned), the inherent winding resistances and reactances of the transformer group 26, 27, 43 must be kept down to a practical minimum. The capacitors 44 assist in achieving this result by adding corrective capacitance to the transmission circuit 28 and thereby maintaining a high power factor in the rotor circuit.

45 represents a series of auxiliary real resistances, in the transmission circuit 28 in parallel with the resistance unit 29, and arranged to be cut into and out of said circuit 28 in succession and at the proper times by the contactor switches 46y, 47y and 48y, operated by the master controller 23. Their effect when thus cut in is to reduce the magnitude of the virtual resistance. Said auxiliary resistances are preferably positioned at the output side of the booster transformer 43 since at that position the magnitude of the current to be dealt with is least.

The utility of these auxiliary resistances 46x and 47x arises from the fact that notwithstanding what has just been said about the wide range of transformation ratio, it is also desirable for the sake of simplicity and for economic reasons to limit the change in the ratio of transformation of the linking transformer proper 26, 27, to approximately 2 to 1; so that if the initial ratio selected is, say 6 to 1, the final ratio would be 12 to 1; and the magnitude of the virtual resistance in the rotor circuit would be reduced to one quarter of its original value. Assuming the torque during the accelerating period of the hoist to be approximately constant, such value of the virtual resistance would be insufficient to bring the speed of the hoist up to more than about 75% of full speed. The progressive cutting in of the auxiliary resistances 46x and 47x enables a smooth increase of speed from said 75% point to full speed to be attained.

For facilitating the procedure of braking by reverse current there is provided the directional switch 49. Said directional switch has two possible positions to one or the other of which it is shifted by the slipping belt 50 driven from the drum shaft 16, whenever said shaft changes its direction of rotation. The co-operation is effected through the master controller 23 as hereafter described.

51 represents contactors whereby the rotor circuit 25 is short-circuited to exclude the primary transformer windings 32, after the motor has been brought to full speed.

The master controller 23 here shown is in general of conventional pattern, modified where necessary for the special purposes of the invention, and more particularly to provide for control of the several contactor switches mentioned above.

The master controller comprises a drum 52 shown as developed to flat form. The drum is positively connected to the driver's lever 22 to be rotated by the latter. It is rotatable from a neutral position 0 to a number of positions or "notches," identified by the letters a to k and by the designation "Forward," for forward driving; and by the similar series of letters a to k and the designation "Reverse," for driving the hoist reversely. The drum carries a long insulated copper segment indicated by 53; a number of similar segments for "Forward" driving indicated by 54a, 55a to 62a; as well as corresponding segments 54, 55 to 62, for "Reverse" driving. The segments of the series 54a to 62a are connected to one another by the inter-connectors a few of which are indicated by numeral 63a; and the segments 54 to 62 are similarly connected to one another by the inter-connectors 63.

Rotation of the drum 52 brings the segments of the series 54a to 62a, and also those of the series 54 to 62, into contact—at the proper notch positions—with members of the series of stationary fingers 64, 65, to 74, depending on the degree and direction of rotation of the drum 52 from the 0 position. One lead 75 from a supply 76 of auxiliary operating current is permanently connected to the segment 53, and the fingers 65 to 74 are connected to the other lead 77 of said auxiliary supply through their respective members of the series of contactor operating coils, numbered respectively 40, 41, 34, 35, 36, 37, 46, 47, 48 and 51.

Said coils operate each its correspondingly numbered contactor switch or group of switches already mentioned and appearing at other points in Figure I; closing its associated contactor switch when itself energised and opening said contactor switch when itself unenergised.

Considering first the local circuits relevant to the coils 40 and 41, these are interconnected by the double pole switch 49, the position of which as pointed out above, is determined by the direction in which the hoist is moving, or last moved. Co-operating with said local circuits are—

(a) The segment 54a and the finger contact 65,
(b) The segment 54 co-operating with the finger contact 66.

Finger 65 is connected to both switch contacts upper F and lower R and finger 66 is connected to both switch contacts upper R and lower F. This combination accordingly gives rise to the four following cases:

| Driver's lever moved from 0 | Position of 49, due to existing, or last, hoist movement— | |
|---|---|---|
| | Hoist moving forward | Hoist moving in reverse |
| Forward | Case 1<br>Circuit:<br>53, 54a, 65, upper F to 40. | Case 2<br>Circuit:<br>53, 54a, 65, lower R to 41. |
| Reversely | Case 3<br>Circuit:<br>53, 54, 66, lower F to 41. | Case 4<br>Circuit:<br>53, 54, 66, upper R to 40. |

This table makes it apparent that whenever the driver's lever 22 and the switch 49 are "similarly" positioned, the coil 40 is selected; and that whenever said lever and said switch are "oppositely" positioned, the 41 coil is selected.

The remaining local circuits viz. those of contactor coils 34, 35, 36, 37, 46, 47, 48 and 51 are the equivalents of the similar local circuits existing in present-day hoist controllers in that, upon the local circuits of coils 34, 35, 36, 37, 46, 47 and 48 being successively energised, they progressively reduce the magnitude of the resistance in the rotor circuit; and the local circuit of coil 51 closes to short-circuit the rotor circuit 25. Their adaptation to the present invention consists in their being arranged to control the correspondingly numbered contactor switches 34y to 37y, 46y to 48y and 51 causing the progressive reduction to zero of the degree of linking afforded by the linking transformer 26, 27.

Before describing the operation of the hoist, it is pointed out that from a knowledge of the duty cycle required of the hoist, distance from the mine surface and other relevant factors, the ohmic value of the real resistance 29 and the other circuit characteristics, such as the ratio of the linking and booster transformers 26, 27 and 43, reactances 44 and so on, will have been determined to produce the maximum starting torque required of the hoist on say the second b or third notch c of the master controller 23.

The following is a description of a typical sequence of operations provided for by the apparatus described.

Let it be assumed that conveyance 19 is to be raised and that for that purpose the hoist will be driven in the "Forward" direction. The first movement of the driver's lever 22 in the forward direction operates through the connection (arrow B) to switch on the mains current 29 and to cause the field of the stator 14 to rotate in the forward direction. The first movement of the hoist resulting from such energisation, moves the switch 49 to the full line position, thus establishing case 1 and energising contactor coil 40 which in turn selects the delta connection of the primary windings 32. Further movement of the driver's lever 22 establishes a circuit through 55a and 67 to energise contactor coil 34 which closes tapping contactors 34y. Through the medium of the 3-phase reactor 38 this sets up the initial low degree of linkage between the rotor circuit and the transmission circuit and the transmission thus causing the real resistance to be reflected in the rotor circuit as the virtual resistance. The initial linkage selected in this manner is of low degree and the virtual resistance is correspondingly high. The motor starts with the required value of torque and operates the hoist with the required rate of acceleration.

Immediately after the closing of contactors 34y, contactor coil 35 is energised through 56a and 68, closing the tapping contactor switches 35y and thereby, through the medium of the reactors 38 setting up an effective value of the transformation ratio intermediate between the values of the taps 34x and 35x and thereby decreasing the value of the virtual resistance a step below its initial high value.

As soon as the motor torque resulting from the closing of tapping contactor 35y is insufficient to maintain the desired rate of acceleration of the hoist, the driver's lever 22 is further advanced in the forward direction to cause segment 55a to pass away from finger contact 67 thereby de-energising coil 34 which in turn opens tapping contact 34y and gives an increased transformation ratio corresponding to tapping 35x in conjunction with half the reactor 38. The next step of movement of the driver's lever energises coil 36 through segment 57a and the finger contact 69 whereby tapping contactor 36y is closed whilst tapping contactor 35y remains closed, and the effective value of the transformation is accordingly intermediate between that of tapping 35x and tapping 36x. Similarly the tapping 37x is closed, first with tapping 36x and then without tapping 36x; and in this manner the four contactors 34y, 35y, 36y, 37y, give seven effective steps of ratio change and corresponding reduction of the virtual resistance.

The reduction due to only tapping 37x being closed still requires the virtual resistance to be further reduced progressively, and it is convenient that this should be done as the master controller reaches successively its three controller notches next preceding the notch at which the rotor circuit is finally short-circuited by means of the contactors 51, 51. For this purpose the driver's lever 22 is further moved to say notch h to establish a circuit through 59a, 71, to coil 46: then through 60a, 72 to coil 47 and finally through 61a, 73, to coil 48; resulting in the contactor switches 46y, 47y, 48y, being closed in succession and the auxiliary resistance 46x, 47x, being brought successively into the transmission circuit 28.

Finally the rotor winding 25 is short-circuited by closing the contactors 51 through the agency of the local coil circuit 62a, 74, to coil 51.

The motor would at this stage have reached full speed, and in a typical hoist installation it would maintain full speed for a period until retardation becomes necessary. Assuming that retardation is effected by reverse current, the driver's lever 22 and drum unit 52 is moved smartly backwards, through neutral 0, to say the first notch a of the "Reverse" series of notches thus reversing the direction of rotation of the field.

However, even on the first reverse notch a the rate of retardation may be excessive (and this is a common defect of present standard forms of rotor control). Such excessive retardation is controlled according to this invention by concurrently bringing in the lower valued base of the two basic transformer ratios. Such base is selected automatically by reason of the driver's lever 22 and the directional switch 49 now being in "opposite" positions, so that case 3 arises and coil 41 is energised.

Thereafter retardation is continued by progressively lowering the value of the virtual resistance by notching the driver's lever in the reverse direction. This, through the drum segments 55, to 58, 59 to 61 successively energises the contactor coils 34, 35, 36, 37, 46, 47, 48; so that the value of the virtual resistance is progressively reduced as it was during the positive acceleration period, though it is to be noted that the hoist may have stopped before this series is completed. Upon the hoist being stopped the hand brake is applied and the driver's lever 22 is brought back to neutral 0.

Accordingly the complete duty cycle is carried out with a smooth and graded rotor speed control of eleven steps, using only four 3-pole and four 2-pole rotor contactors.

The direction of the conveyance 19 has now to be reversed. This is effected by notching the driver's lever away from neutral 0, as before, but this time in reverse. The first effect of the initial movement of the hoist in reverse is to shift the directional switch 49 over to the dotted line position and to bring segment 54 into contact with the finger contact 66.

Case 4 then arises, and coil 40 is energised; thus restoring the higher basic ratio of the transformer. Thereafter the series of steps is exactly as described for raising conveyance 19 except that the series of segments 55 to 62 performs the functions previously performed by the series of segments 55a to 62a.

The arrangement of the contactors 40x as shown gives a value of the second basic ratio equal to ⅓ of the higher ratio. The second basic ratio may, however, be produced in other values say ½, by means of tappings 78 brought out from the rotor windings 24 of the transformer, to the delta/star contactor 40x, 41x, as illustrated in Figure II.

It will be noted that in the apparatus described above contactors are freely employed in place of ordinary switches; and this is done on account of the necessity for reliable and rapid response to movements of the driver's lever.

If dynamic braking is employed in place of reverse current braking, the apparatus described above permits braking torques to be obtained of a value comparable with the positive accelerating torques obtainable by means of such apparatus.

The lower dual base of transformation, besides its utility in connection with reverse current braking, offers also advantages under conditions where low torques are desirable, whether for accelerating or retarding the load; for instance during shaft examination or shaft sinking. In these cases the directional switch 49 is cut out of operation.

For the purpose of properly dimensioning the virtual resistance and other items, use is made of the following two Equations A and B.

*Torque equation of the induction motor.*—Let $e$ and $i$ represent the voltage and current per phase induced in the rotor, $fs$ the slip frequency, $R$ and $L$ the resistance and inductance, respectively, per phase in the rotor circuit; then the torque is proportional to $i \cos \phi$, where $\cos \phi$ is the rotor power factor. Further, $$i \cos \phi = \frac{KRfs}{R^2 + (2\pi fsL)^2}$$

where K is a constant and the maximum value for this torque expression is obtained when $$R = 2\pi fsL \qquad \text{A}$$

i. e. when the total resistance per phase is equal to the total reactance per phase in the rotor circuit. The latter quantity is directly proportional to rotor slip frequency.

*Transformer equivalent resistance and reactance.*—Let $R_1$, $X_1$ represent the values of total resistance and reactance per phase on any one side ($a$) of a transformer, and $R_2$ and $X_2$ the values of the same quantities on the other side ($b$) of the same transformer; then the equivalent resistance and reactance per phase, viz.

$$R_1^1 \text{ and } X_1^1$$

when referred from the ($a$) side to the ($b$) side of the transformer circuit is inversely proportional to the square of the turns ratio of the transformer i. e.

$$R_1^1 = R_1 \left(\frac{T_2}{T_1}\right)^2 \text{ and } X_1^1 = X_1 \left(\frac{T_2}{T_1}\right)^2$$

where $$\frac{T_1}{T_2} = \text{the } \frac{(a)}{(b)} \text{ turns ratio}$$

The total equivalent resistance and reactance per phase in the ($b$) circuit of the transformer is therefore represented by—

$$\left.\begin{aligned} R(\text{total}) &= R_2 + R_1\left(\frac{T_2}{T_1}\right)^2 \\ X(\text{total}) &= X_2 + X_1\left(\frac{T_2}{T_1}\right)^2 \end{aligned}\right\} \quad \text{B}$$

The required ohmic value R of the virtual resistance is determined by the application of the above torque Equation A, to give the maximum starting torque required from the hoist, usually 1.5 to 2.5 times the normal full load torque of the motor at full speed. The actual ohmic value of the real resistance unit (e. g. the unit 29 in Figure I) is then obtained by application of the transformer Formula B i. e.

$$\text{Value of resistance unit} = R\left(\frac{T_2}{T_1}\right)^2$$

$T_1$ in this instance being the number of the effective turns on the side of the transformer connected to the rotor circuit, and $T_2$ the number of effective turns on the opposite side.

The ratio of the transformation is selected initially in relation to the standstill rotor voltage to provide a suitable pressure for transmitting economically—through the connecting cable—the energy to be conveyed away from the vicinity and to be dissipated, for instance as heat, by the real resistance.

If the transformer windings, turns ratio, core dimensions, etc., with the exception of the interturn insulation and also the major insulation are designed to suit the standstill rotor voltage and frequency, the transformer rating will be equally suitable for all voltage and frequency conditions to be met throughout the required range of rotor control, including reverse current braking. This will be evident from the fact that, as the rotor speed increases, both the rotor voltage and the frequency fall in unison, whilst for reverse current braking at full speed both the rotor voltage and the frequency are doubled. It follows, therefore, that the flux density and the magnetising current of the regulating transformer remain substantially constant for all normal rotor speed conditions. The transformer insulation must be designed for a working pressure of twice the maximum standstill voltage of the rotor.

A high efficiency of heat transfer out of the mine is readily obtainable in view of the following considerations:

(a) The nominal transformer ratio would be chosen in relation to the standstill rotor voltage of the A. C. hoist motor to provide a suitably high secondary pressure (say 6,000 volts) for economically transmitting over a distance of several thousand feet the energy to be dissipated rheostatistically.

(b) The ohmic value of the remote fixed resistance will of necessity be high in comparison with transformer winding, cable and other resistances in the rotor circuit of the hoist motor, due to the application of the basic formulae of the invention i. e.

$$R(\text{actual}) = R(\text{virtual}) \times \left(\frac{T_2}{T_1}\right)^2$$

(c) The transformer is apparatus having inherently high efficiency and the heat losses in this unit will only amount to a small proportion of its full load rating.

(d) In addition to the transformer heat losses, similar losses will occur in the cable to the remote fixed resistance, but the efficiency of heat transmission out of the mine by cable is equal to the ohmic resistance per phase of the remote fixed resistance divided by the sum of this ohmic resistance and the ohmic resistance per phase of the HT cable.

In the case of the hoists referred to in columns 3 and 4 where the HT cable would be .2 sq. in. section and approximately 6,000 feet in length and the remote resistance would have an ohmic value of approximately 10.2 ohms/phase the efficiency of heat transfer would be approximately equal to $$\frac{10.2}{.254+10.2} = 97.6 \text{ per cent}$$

and the overall efficiency including the transformer losses approximately equal to say 96 per cent×97.6 per cent=93.7 per cent. Accordingly, said hoists when modified according to the invention, 75 per cent to 80 per cent of the total heat generated by them can be readily prevented from entering the mine workings.

The balance of the heat dissipated from the A. C. hoists mentioned in columns 3 and 4, that is approximately 7,000 B. t. u./min., shows a very substantial advantage over the corresponding rate of heat dissipation from an alternative pair of Ward-Leonard hoists which would be 20,580 B. t. u. per minute.

The amount of energy which is dissipated as heat by the auxiliary resistances 45, is negligible, being only approximately 3 per cent, of the total rheostatic loss, as will be evident from a study of the H. P./time diagram of any typical A. C. hoist installation bearing in mind that the auxiliary resistance 45 is in parallel with the main surface resistance 29, at the end of the acceleration period only, and the efficiency of heat transfer out of the mine is, therefore, reduced only by this amount by the presence of auxiliary control resistances located in the hoist chamber.

With regard to the rating of the capacitors 44, it is pointed out that both the total rotor circuit reactance and the effective corrective capacity fall in direct proportion to the rotor frequency, and, in addition, the capacity current falls with reduction in the induced rotor voltage. It is preferable, therefore, to connect the corrective capacitors (on the output side of the booster transformer as shown) where, due to the transformer ratio changes as the rotor speed rises, the voltage remains substantially constant throughout the major portion of the accelerating cycle of the hoist.

*Rating of units*

It will be readily appreciated that the unit sizes of the rotor control apparatus are inherently small compared with the R. M. S. horsepower rating of the associated hoist, since this former apparatus is in operation only during the positive and negative accelerating periods of each hoisting cycle. The units should, therefore, be given a short-time rating, based on intermittent operation for known intervals of time, or in effect the units should be rated on the R. M. S. value of the accelerating and retarding cycles, taken over the full duty cycle time.

Figure III shows another form of the invention which is to a large extent similar to the Figure I form and differs from the last named principally in that the range of transforming ratio of the linking transformer 26, 27 (apart from the change of the basic ratio) is effected by a three-phase induction regulator, instead of the on-load tap-changing gear described in connection with Figure I.

The linking transformer 26, 27 remains of the same basic construction as that of Figure I, in that it comprises the delta connected primary windings 32 adjustable to star connection by means of the contactors 40x to 41x; together with the star connected secondary windings 33. However, the tap-changing gear 34x, 35x, 36x, 37x of Figure I is omitted so that the transformer 26, 27 itself is—apart from having the dual basic ratio—of fixed ratio. In order to obtain variation of such fixed ratio, and thereby to vary the magnitude of the virtual resistance in the rotor circuit 25, the secondary windings 33 of the transformer 26, 27 are connected to the remainder of the transmission circuit 28 through the adjustable induction regulator 79; said variation being accordingly obtained by alteration of the angular position of the rotor 80 of said induction regulator 79 effected by means 81 rotatable with the driver's lever 22. Auxiliary resistances 45, equivalent to the auxiliary resistances 45 of Figure I, and capacitators 44, equivalent to the capacitators 44 of Figure I, are retained in the transmission circuit.

Figure III also shows the modification of the master controller appropriate to this form of the invention. The controller retains the 53 segment and the segments 54 and 54a for the switch 49 and for the 40 and 41 operating coils, as in Figure I. It differs from the last named in comprising only the four contactor coils 46, 47, 48, 51 for operating the four contactor switches bearing the same reference numerals in Figure I.

It is pointed out that in order to bring the numerical values in this case equivalent to those mentioned above in connection with the Figure I example i. e. from 6/1 to 12/1, the fixed ratio of the linking transformer should be 9/1, and the induction regulator 79 should be arranged to buck and boost this transformation ratio accordingly. This change in the effective ratio will reduce the virtual resistance to one quarter of its original value as the driver's lever 22 is notched away from 0; resulting, as before, in acceleration of the rotor, at constant torque, to approximately 75 per cent of full speed. At this stage the auxiliary resistances 45 are introduced into the transmission circuit to reduce the virtual resistance still further, and finally the rotor short-circuiting contactors 51 close to accelerate the rotor to full speed.

The contactors 40x and 41x are used, as before, to ameliorate the braking rate when using reverse current braking.

The particular advantage of this form of the invention is the inherently smooth change of effective ratio of the rotor transformer and corresponding smooth change in the magnitude of the virtual resistance, resulting in stepless speed control. A secondary advantage as compared with Figure I is the elimination of transformer tap-changing contactors or equivalent gear and their associated maintenance.

In this example the full range of rotor speed control is obtained by means of the induction regulator and four 2-pole contactors; and the control circuits are correspondingly simplified, as will be apparent from the drawing.

The induction regulator 79 is apparatus having relatively high inherent leakage reactance in comparison with the standard transformer. However, the equivalent reactance of the induction regulator, when referred to the rotor circuit 25 of the hoist motor 14, 15, is reduced by the square of the ratio of the rotor transformer, in accordance with the Formulae B stated above. Nevertheless, the design of the induction regulator should be such that leakage reactance is kept to a practical minimum.

The effective transformation ratio variation corresponding to the angular displacement of the rotor 80 of the induction regulator rotor 79 through 180 electrical degrees, from the full buck position R to the full boost position Q (see Figure IV), follows an approximate sine law, so that if there were linear coupling between the driver's lever 22 and the induction regulator 79, the rate of change in effective ratio relatively to the magnitude of the displacement of the lever from zero position, would vary, reaching a maximum at mid stroke of the driver's lever. It is preferred therefore to provide for linear equivalence between the movement of the driver's lever and the rate of change of said effective ratio.

Further, it is desirable that the rate of rotation of the induction regulator 80 in the direction causing hoist acceleration or braking should be limited to a predetermined maximum, whilst the return of said rotor should not be similarly limited.

Figure IV shows an example of apparatus for coupling the driver's lever 22 to the rotor 80 of the induction regulator 79 through the medium of a servo-motor 82, which embodies the two characteristics last mentioned.

The rotor 80 is moved clockwise by the piston 83 of an oil pressure servo-motor cylinder 84 working against a counterweight 85 which counterweight returns the rotor 80 to its full buck position upon the servo-motor ceasing to exert force.

The driver's lever 22 is fast with a cam drum 86 fitted with the pair of cams 87 extending in opposite directions from the neutral position of said lever; one being active during movement of the driver's lever in the "Forward" direction and the other during "Reverse" movement. Whichever cam is active raises the cam follower 88 against the opposing force of the counterweight 89. The profile of each cam 87 is so formed that in raising the follower 88 the cam active for the moment so modifies the movement derived from the lever 22 that the modified movement represents the aforesaid linear relationship between the movement of the lever 22 and the rate of change of transformation ratio effected by the induction regulator 79.

This modified movement is transmitted to the rotor 80 by the servo-motor piston 82.

Said servo-motor piston 83 operates in the orthodox manner under the control of its valve 90 to copy the positions and changes of position, of the cam follower 88. The valve 90 is of usual construction comprising the grooved piston valve member 91 slidable in its casing or cylinder 92 to connect the cylinder port 93 with the source 94 of oil under pressure or with the exhaust port 95 according as the valve member 91 is raised or lowered; or to close both inlet and outlet when said valve member 91 is in its neutral position shown.

Such positioning of the valve member 91 is brought about by pivotally attaching its rod 96 to a mean point 97 of the floating lever 98, either end 99 or 100 of which is adapted to act as a fulcrum to the extent to which such end is stationary; the grooved piston valve member 91 receiving from said floating lever 98 the algebraic sum of any vertical displacements imparted to its respective ends by the links 101, 102 from which said ends are suspended respectively.

Rising movement of the active end 88a of the cam follower 88 tends to raise the valve member 91 by means of the train comprising the link 103; motion reversing lever 104; link 101, and the floating lever 98 pivoting on its end 100. Reverse motion of the follower tends to depress the valve member 91 through the same train. Anti-clockwise movement of the rotor 80 tends to depress the valve member 91 to exhaust the cylinder 92; through the train comprising the bell-crank 105, link 106, bell-crank 107 and link 102.

Control of the rate of movement of the rotor 80 away from its full buck position R is brought about by means of the orifice plate 108 in the pipe 94 supplying high pressure oil to the valve 90 and so to the cylinder 84. The exhaust port 95 on the other hand is not similarly restricted.

Formulae A and B are appliable to the design of this form of the invention.

The essential distinction between the form of the invention shown in Figure V and the two forms previously described is that in the Figure V example the real resistance is of variable magnitude as it is in an orthodox A. C. hoist motor; and that the variation of its magnitude is remotely controlled from the driver's position.

In this example the transformer 26, 27 is similar to that of Figure III and performs the same functions of linking the two circuits 25, 28; reflecting the real resistance 29x into the rotor circuit 25: transmitting energy from the rotor circuit 25 to the transmission circuit 28: giving dual basic transformation ratios; and raising the voltage for transmission to the surface.

The real resistance 29x, situated at the surface, is of the grid type variable in magnitude in order to effect corresponding adjustments of the magnitude of the virtual resistance in the rotor circuit. Such variation of magnitude is effected by means of the contactor switches numbered 109y to 118y. Said contactor switches are remotely controlled by the driver's lever 22 through the medium of an electrical motion-transmitting system; that shown being the "Selsyn" system comprising a wound rotor 119 attached to the driver's lever 22 to rotate therewith: a similar wound rotor 120 at the remote position of the resistance 29x: stator windings 121 and 122 associated respectively with said rotors: an auxiliary A. C. single phase current supply 123; and a five core pilot cable 124 forming the electrical transmission line extending through the shaft 13 and electrically connecting the instrument 119, 121 with the instrument 120, 122. The effect produced by the system is that the angular position of the rotor 119 and any change of such position is accurately and promptly copied by the rotor 120.

The master controller is virtually divided into two; indicated individually by 23A and 23B. Controller 23A is situated at the driver's position underground, and is directly connected to the driver's lever 22. Its functions (as far as this invention is concerned) are confined to controlling the 40x and 41x contactors by which the changes are made from delta connection of the primary winding 32 to star connection and vice versa; and controlling the short-circuiting switch 51. The rotor 119 of the motion-transmission system is also connected directly to the driver's lever 22.

The controller 23B on the other hand, is positioned at the surface 30 and controls the real resistance 29x. Said controller is arranged to energise in succession the coils of the series 109 to 118 as the driver's lever 22 is moved progressively from its neutral position in either direction, and each such coil, when energised closes its corresponding contactor switch; resulting in the effective magnitude of the real resistance 29x being progressively reduced from maximum to zero and the virtual resistance in the motor rotor circuit 25 being similarly diminished.

In Figure VI there is shown a modification of the last described arrangement in which the grid resistance 29x is replaced by the well known adjustable liquid resistance indicated by 125; and comprising the three sets of electrode pairs 126, 127, 128, which are caused to approach one another or separate from one another in conformity with the movements of the driver's lever 22.

129 is a weight tending to separate the electrode pairs 126, 127, 128 and 130 is the piston and cylinder combination of a servo-motor 131 which is actuated to move the electrodes towards one another. The servo-motor system shown is the same as that shown in Figure IV except that the initial movement comes from the crank 132 fast with the rotor 119 of the "Selsyn" unit 119, 120.

We claim:

1. In combination, a mine having a substantially confined chamber, an alternating current wound-rotor induction motor in said chamber, a step-up magnetic voltage transformer in said chamber having its primary winding connected to said rotor, a relatively long transmission circuit connected to the secondary winding of said transformer and extending outside said chamber, and a dissipative resistance load located exteriorly of said chamber and connected to said transmission circuit, whereby a substantial portion of the energy required to be dissipated by said rotor may be transmitted for disposal exteriorly of said chamber.

2. In combination, a mine having a substantially confined chamber, an alternating current wound-rotor induction motor in said chamber, a step-up magnetic voltage transformer in said chamber having its primary winding connected to said rotor, a relatively long transmission circuit connected to the secondary winding of said transformer and extending outside said chamber, and a dissipative resistance load located exteriorly of said chamber and connected to said transmission circuit, whereby a substantial portion of the energy required to be dissipated by said rotor may be transmitted for disposal by said resistance load exteriorly of said chamber, and means for adjusting the transformation ratio of said transformer.

3. In combination, a mine having a substantially confined chamber, an alternating current wound-rotor induction motor in said chamber, a first step-up magnetic voltage transformer in said chamber having its primary winding connected to said rotor, a second step-up magnetic voltage transformer in said chamber having its primary winding connected to the secondary winding of the first transformer, a relatively long transmission circuit connected to the secondary winding of the second transformer and extending outside said chamber, and a dissipative resistance load located exteriorly of said chamber and connected to said transmission circuit, whereby a substantial portion of the energy required to be dissipated by said rotor may be transmitted for disposal exteriorly of said chamber.

4. In combination, a mine having a substantially confined chamber, an alternating current wound-rotor induction motor in said chamber, a step-up magnetic voltage transformer in said chamber having its primary winding connected to said rotor, an induction regulator in said chamber having its primary winding connected to the secondary winding of said transformer, a relatively long transmission circuit connected to the secondary winding of said induction regulator and extending outside said chamber, and a dissipative resistance load located exteriorly of said chamber and connected to said transmission circuit, whereby a substantial portion of the energy required to be dissipated by said rotor may be transmitted for disposal exteriorly of said chamber.

5. In combination, a mine having an underground chamber, a shaft extending substantially vertically from surface level to said chamber, a second shaft extending substantially vertically from said chamber in a downward direction, means for directing ventilating air from surface level through said first shaft and said chamber and thence into said second shaft, an alternating current wound-rotor induction motor in said chamber, a step-up magnetic voltage transformer in said chamber having its primary winding connected to said rotor, a relatively long transmission circuit connected to the secondary winding of said transformer and extending outside said chamber to surface level, and a dissipative resistance load located at surface level outside the path of air supplied by said means and connected to said transmission circuit, whereby a substantial portion of the energy required to be dissipated by said rotor may be transmitted for disposal exteriorly of said chamber and of said shafts.

6. In combination, a mine having an underground chamber, a first shaft extending substantially vertically from surface level to said chamber, a second shaft extending substantially vertically from said chamber in a downward direction, means for directing ventilating air from surface level through said first shaft and said chamber and thence into said second shaft, an alternating current wound-rotor induction motor in said chamber, a first step-up magnetic voltage transformer in said chamber having its primary winding connected to said rotor, a second step-up magnetic voltage transformer in said chamber having its primary winding connected to the secondary winding of the first transformer, a relatively long transmission circuit connected to the secondary winding of the second transformer and extending outside said chamber to surface level, and a dissipative resistance load located at surface level outside the path of air supplied by said means, and connected to said transmission circuit, whereby a substantial portion of the energy required to be dissipated by said rotor may be transmitted for disposal exteriorly of said chamber and of said shafts, to avoid raising the ambient temperature in said chamber and shafts.

7. In combination, a mine having an underground chamber, a first shaft extending substantially vertically from surface level to said chamber, a second shaft extending substantially vertically from said chamber in a downward direction, means for directing ventilating air from surface level through said first shaft and said chamber and thence into said second shaft, load hoisting means, an alternating current wound-rotor induction motor in said chamber for driving said hoisting means, a step-up dual-ratio magnetic voltage transformer in said chamber having its primary winding connected to said rotor, a manual controller for controlling the direction of operation of said hoisting means, a directional switch connected for control by said hoisting means in accordance with its direction of operation, a dissipative resistance load connected to the secondary of said transformer, and means controlled jointly by said controller and said switch for selecting the lower transformer ratio whenever said controller and switch are conditioned oppositely to one another with reference to the direction of operation of said hoisting means.

8. The invention in accordance with claim 1, including means for adjusting the magnitude of said resistance load, and means located within said chamber for controlling said adjusting means.

9. The invention in accordance with claim 3, including means located exteriorly of said chamber and adjacent said resistance load for adjusting the magnitude of said resistance load, and means located within said chamber for controlling said adjusting means.

GEORGE BRADFORD.
DESMOND MULOCK-BENTLEY.
NORMAN HUGH AURET.

REFERENCES CITED

The following references are of record in the file of this patent:

UNITED STATES PATENTS

| Number | Name | Date |
|---|---|---|
| 660,911 | Lamme | Oct. 30, 1900 |
| 730,013 | Girault | June 2, 1903 |
| 731,887 | Girault | June 23, 1903 |
| 893,988 | Durack | July 21, 1908 |
| 1,495,352 | O'Toole | May 27, 1924 |
| 1,842,098 | Howard | Nov. 15, 1928 |
| 2,058,252 | Parsons | Oct. 20, 1936 |
| 2,152,172 | Bartlett | May 23, 1938 |
| 2,232,587 | Brandt | Feb. 18, 1941 |
| 2,420,192 | Rathbun | May 6, 1947 |
| 2,432,861 | Cook | Dec. 16, 1947 |